United States Patent
Aonuma et al.

[11] Patent Number: 5,999,420
[45] Date of Patent: Dec. 7, 1999

[54] SWITCHING POWER SOURCE

[75] Inventors: Kenichi Aonuma, Sakura; Masakazu Takagi, Narita, both of Japan

[73] Assignee: TDK Corporation, Tokyo, Japan

[21] Appl. No.: 09/207,721

[22] Filed: Dec. 8, 1998

[30] Foreign Application Priority Data

Feb. 18, 1998 [JP] Japan .................................. 10-035740

[51] Int. Cl.$^6$ ................................................ H02M 3/335
[52] U.S. Cl. ................ 363/21; 363/56; 363/127
[58] Field of Search .................. 363/16, 20, 21, 363/26, 56, 127; 323/282

[56] References Cited

U.S. PATENT DOCUMENTS

| | | | |
|---|---|---|---|
| 4,870,555 | 9/1989 | White | 363/21 |
| 5,724,235 | 3/1998 | Shimamori et al. | 363/21 |
| 5,726,869 | 3/1998 | Yamashita et al. | 363/21 |
| 5,734,563 | 3/1998 | Shinada | 363/21 |
| 5,781,420 | 7/1998 | Xia et al. | 363/21 |
| 5,870,299 | 2/1999 | Rozman | 363/127 |
| 5,872,705 | 2/1999 | Loftus, Jr. et al. | 363/21 |
| 5,886,881 | 3/1999 | Xia et al. | 363/21 |

FOREIGN PATENT DOCUMENTS

| | | |
|---|---|---|
| 4-4750 | 1/1992 | Japan . |
| 5-260738 | 10/1993 | Japan . |
| 7-194104 | 7/1995 | Japan . |

*Primary Examiner*—Adolf Deneke Berhane
*Attorney, Agent, or Firm*—Frishauf, Holtz, Goodman, Langer & Chick, P.C.

[57] ABSTRACT

There is disclosed a synchronized rectifier type switching power source device in which losses and noise generation due to differences in operating delay times in the input and output switching elements can be suppressed. A signal timing adjusting device is provided for controlling the timing of the control signal applied to the first switching device provided in the input side and those of the control signals applied to the second and third switching devices provided in the output side, so that the control signal is applied to the first switching device with a timing delayed as compared with the timings of the control signals applied to the second and third switching devices to thereby compensate for the operating time delay among the first switching device and the second and third switching devices due to the differences in the voltage durability and the current capacity among these switching devices.

4 Claims, 7 Drawing Sheets

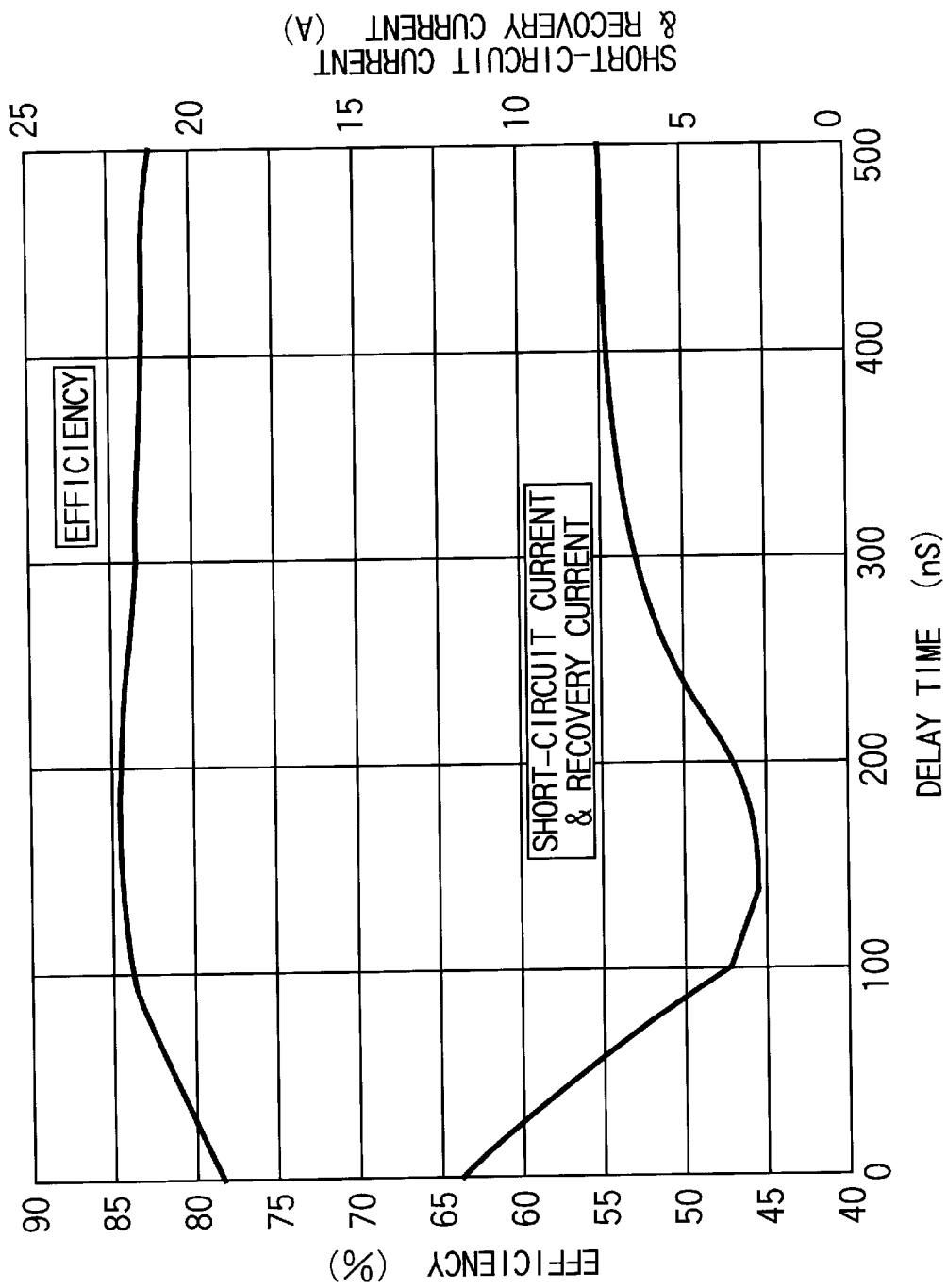

SWITCHING POWER SOURCE

FIELD OF THE INVENTION

The present invention relates to a switching power source device comprising an input circuit having a switching device for switching an input power into a high frequency voltage, a transformer for receiving the high frequency voltage to produce an output of a different voltage, and an output rectifying circuit for rectifying the output from the transformer to produce a DC output of a desired voltage. More particularly, the present invention pertains to a synchronized rectifier type switching power source device having a switching device adopted as a rectifying element in the output rectifying circuit and controlled in synchronized relationship with the operation of the switching device in the input circuit.

PRIOR ART

A well known switching power source device generally includes an input switching device for switching an input power to produce a high frequency voltage. The high frequency voltage is then applied to a primary winding of a transformer which includes a secondary winding connected with an output circuit including a rectifying circuit. In this type of switching power source device, the rectifying circuit includes a rectifying element such as a diode and a magnetic element such as a coil, the rectifying element and the magnetic element being connected in series with the secondary winding of the transformer. A second rectifying element is provided and connected in parallel with the secondary winding. The input switching device is controlled by a control circuit which produces a control signal for controlling the input switching device so as to produce an output voltage of a desired value.

A synchronized rectifier type switching power source device has been known and is characterized by a switching element which is provided in the place of the diode for reducing forward direction voltage drop which is inherent to the diode. The switching element is controlled in a synchronized relationship with the input switching device. Switching power sources of this type are described in Japanese Laid-Open patent publications Hei 4-4750, 5-260738 and 7-194104, and the U.S. Pat. No. 4,870,555.

FIG. 5 shows an example of a conventional synchronized rectifier type switching power source device.

Referring to FIG. 5, the device includes a transformer 11 having a primary winding 11a connected with a power source 13. The primary winding 11a is further connected with a switching element 1 which may be of an FET type. The transformer 11 further includes a secondary winding 11b connected with an output circuit 14 having a rectifying circuit 12. The output circuit 14 is connected with a load 15. The rectifying circuit 12 includes a second switching element 2 and a magnetic element or an inductor 12a which are connected in series with the secondary winding 11b of the transformer 11. The rectifying circuit 12 further includes a third switching element 3 connected in parallel with the secondary winding 11b of the transformer 11. A control circuit 4 is provided for controlling the switching elements 1, 2 and 3. The control circuit 4 is connected with the output circuit 14 through an insulating circuit 9 which may be constituted by a photo-coupler or a transformer, or through a load voltage detecting circuit 10. The control circuit 4 produces a PWM (pulse width modulated) control signal V4 for controlling the switching element 1. The output or the control signal V4 of the control circuit 4 is applied to the gate electrode of the first switching element 1 through a driving circuit 5 which produces an output V1. The control signal V4 from the control circuit 4 is further connected with driving circuits 6 and 7 through the insulating circuit 9 which may be constituted by a photocoupler or a transformer as already described. The driving circuit 6 produces an output V2 having a polarity which is the same as that of the output V1 applied to the first switching element 1. The output V2 is applied to the gate electrode of the second switching element 2. The driving circuit 7 produces an output V3 having a polarity which is opposite to that of the output V1 applied to the first switching element 1. The output V3 is applied to the gate electrode of the third switching element 3.

As well known in the art, the first switching element 1 is controlled by the control signal from the control circuit 4 to produce a high frequency voltage from the voltage received from the power source 13. The high frequency voltage is then applied to the primary winding 11a of the transformer 11. The voltage generated at the secondary winding 11b of the transformer 11 is rectified by the rectifying circuit 12 to form an output of the output circuit 14. The output voltage of the output circuit 14 is detected by the load voltage detecting circuit 10 and the detected voltage signal is applied to the control circuit 4. The control circuit 4 produces a control signal for controlling the first switching element 1 in a manner that an output voltage of a desired value is produced. In the rectifying circuit 12, the second switching element 2 is ON when the first switching element 1 is ON, whereas the third switching element 3 is OFF when the first switching element 1 is ON. When the first switching element 1 is turned off, the second switching element 2 is turned off and the third switching element 3 is turned on.

In the case where control signals of the same timing are applied to the first, second and third switching elements, there are produced deviations in operating timings among respective switching elements due to differences in operating characteristics of the switching elements. More specifically, each switching element has a certain value of delay time from the instance wherein a driving voltage is applied to the gate electrode to the time wherein the drain current flowing through the switching element increases to a steady value. There is further a delay time from the instance wherein the driving voltage to the gate electrode is interrupted to the time wherein the drain current is decreased to zero. Due to the delay times, there will be a decrease in the efficiency of the switching power source device.

Describing in more detail, the input switching element 1 is generally comprised of an FET of a high voltage durability and low current capacity in view of a high input voltage. The input switching element 1 therefore has a relatively short delay time both in turning on by applying a driving voltage to the gate electrode and in turning off by relieving the driving current from the gate electrode. To the contrary, the voltage at the output side is relatively low. Each of the output switching elements 2 and 3 is therefore made of an FET which has a relatively low voltage durability and a high current capacity. These switching elements 2 and 3 thus have relatively long delay time both in turning on by applying a driving voltage to the gate electrode and in turning off by relieving the driving current from the gate electrode.

FIG. 6 shows voltage and current waveforms in various portions in the switching power source device shown in FIG. 5. When the control signal V4 is turned from low to high at the timing $t_0$, the output V1 from the driving circuit 5 and the output V2 from the driving circuit 6 are simultaneously turned to high. The output V3 from the diving circuit 7 is at the same time turned to low. The switching element 1 is turned on after a time delay from the timing $t_0$, which is determined by the operating characteristics of the switching element 1, and current $I_1$ flows through the primary winding 11a of the transformer 11. At the same time, current $I_2$ is generated at the secondary winding 11b of the transformer 11. The current $I_3$ which has been flowing through the third switching element 3 starts to decrease at the timing $t_1$, and becomes zero at the timing $t_2$. Due to the operating characteristics of the switching element 3, the time delay in the switching element 3 is longer than that in the switching element 1. Therefore, the switching element 3 is still in the on state at the timing $t_2$. The secondary winding 11b is then short-circuited through the switching elements 2 and 3 to produce short-circuit current of a substantial value. This will cause a decrease in efficiency and produce noise. Since the switching element 2 also has a longer delay time than the switching element 1, the switching element 2 is in the off state at the timing $t_2$. Thus, the short-circuit current through the switching element 2 does not flow through the channel between the drain and the source but through a parasitic diode. This will case an increase in loss. The portion of the current $I_2$ which flows through the parasitic diode is shown by a shadowed area in FIG. 6.

When the control signal V4 is turned from high to low at the timing $t_3$, the output V1 from the driving circuit 5 and the output V2 from the driving circuit 6 are turned to low. At the same time, the output V3 from the driving circuit 7 is turned from low to high. The switching element 1 is turned off at the timing $t_4$ after a delay time from the timing $t_3$, which is determined by the operating characteristics of the switching element 1, and the current $I_1$ and the current $I_2$ start to decrease, whereas the current $I_3$ starts to increase. The switching element 3 is not on at this instance, so that current flows in the switching element 3 through a parasitic diode causing an increased loss. The portion of the current $I_3$ which flows through the parasitic diode is shown by a shadowed area in FIG. 6.

SUMMARY OF THE INVENTION

The present invention has an object to provide a synchronized rectifier type switching power source device in which losses and noise generation due to the aforementioned differences in operating delay times in the input and output switching elements can be suppressed.

In order to accomplish the above and other objects, the present invention provides a synchronized rectifier type switching power source device including a switching circuit having a first switching device for converting an input voltage into a high frequency voltage, a transformer having a primary winding connected with the switching circuit and a secondary winding connected with an output circuit, the output circuit including a rectifying device having a second switching device and a magnetic element connected in series with the secondary winding of the transformer, the rectifying device further having a third switching device connected in parallel with the secondary winding of the transformer. There is provided a control device for producing a control signal which is to be applied to the first switching device for controlling the same in a manner that an output voltage of a predetermined value is produced. The second switching device is controlled by the control device through a signal synchronized with the control signal applied to the first switching device. The third switching device is controlled by the control device through a signal which is opposite in timing to the control signal applied to the first switching device. The characteristic feature of the switching power source device in accordance with the present invention is in a signal timing adjusting device for controlling the timing of the control signal applied to the first switching device and those of the control signals applied to the second and third switching devices, so that the control signal is applied to the first switching device with a timing delayed as compared with the timings of the control signals applied to the second and third switching devices to thereby compensate for the operating time delay among the first switching device and the second and third switching devices due to the differences in the voltage durability and the current capacity among these switching devices. Most preferably, the signal timing adjusting device is constituted as a time delay device for delaying the timing of the control signal applied to the first switching device. In this instance, it is also preferable that the time delay device is capable of determining separately the delay time for the turning on signal and the delay time for the turning off signal. According to a further preferable aspect of the present invention, there is provided a load current detecting device so that the delay time for the turning on signal for the first switching device can be changed in accordance with is the value of the load current.

According to the switching power source device in accordance with the present invention, the signal timing adjusting device functions to adjust the timing at which the control signal is applied to the first switching device with respect to the timing at which the control signals are applied respectively to the second and third switching devices in a manner that the timing of the control signal for the first switching device is delayed than the timing of the control signals for the second and third switching devices. Thus, it is possible to compensate for the difference in the operating time delay between the first switching device and the second and third switching devices due to the difference in the voltage durability in these switching devices. As the results, it is possible to synchronize the on and off timings completely among the first, second and third switching devices. Thus, it is possible to reduce current through the parasitic diodes in the switching devices. Losses can therefore be decreased and generation of noise can be suppressed.

DESCRIPTION OF THE PREFERRED EMBODIMENT

The present invention will now be described with reference to embodiments shown in the accompanying drawings.

Figure 1:
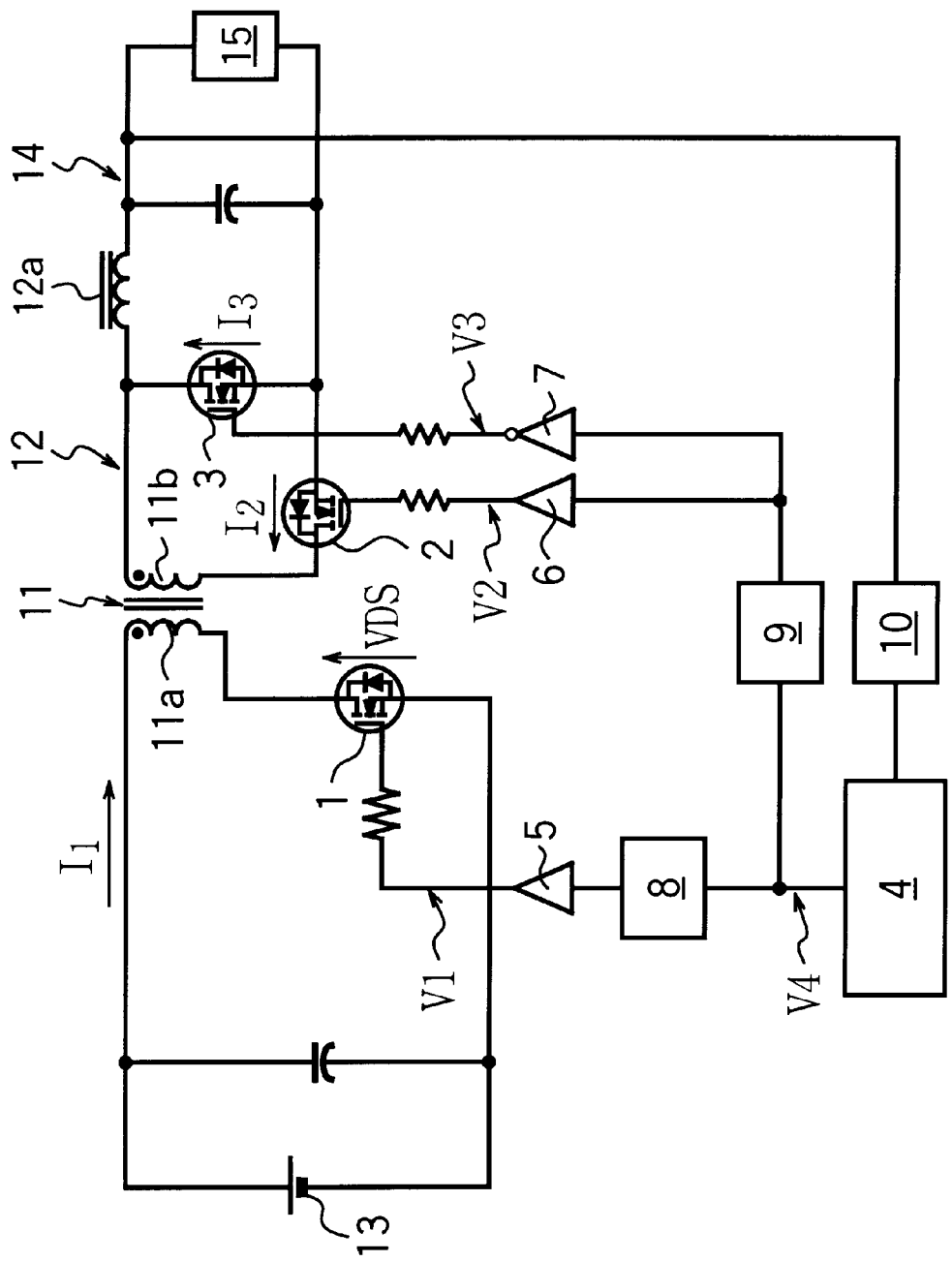
FIG. 1 is a circuit diagram showing a switching power source device in accordance with one embodiment of the present invention.
Figure 5:
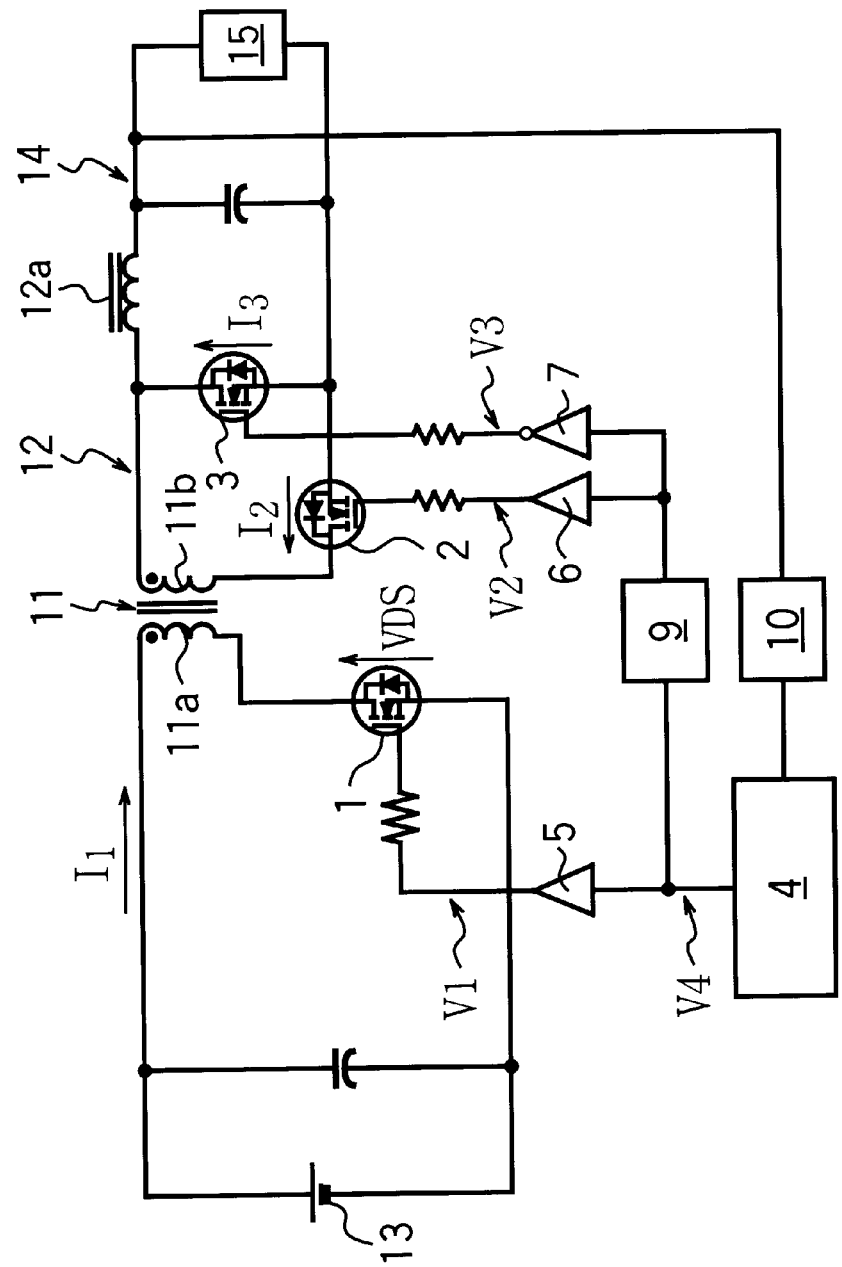
FIG. 5 is a circuit diagram similar to FIG. 1 but showing a conventional synchronized rectifier type switching power source device.
Figure 6:
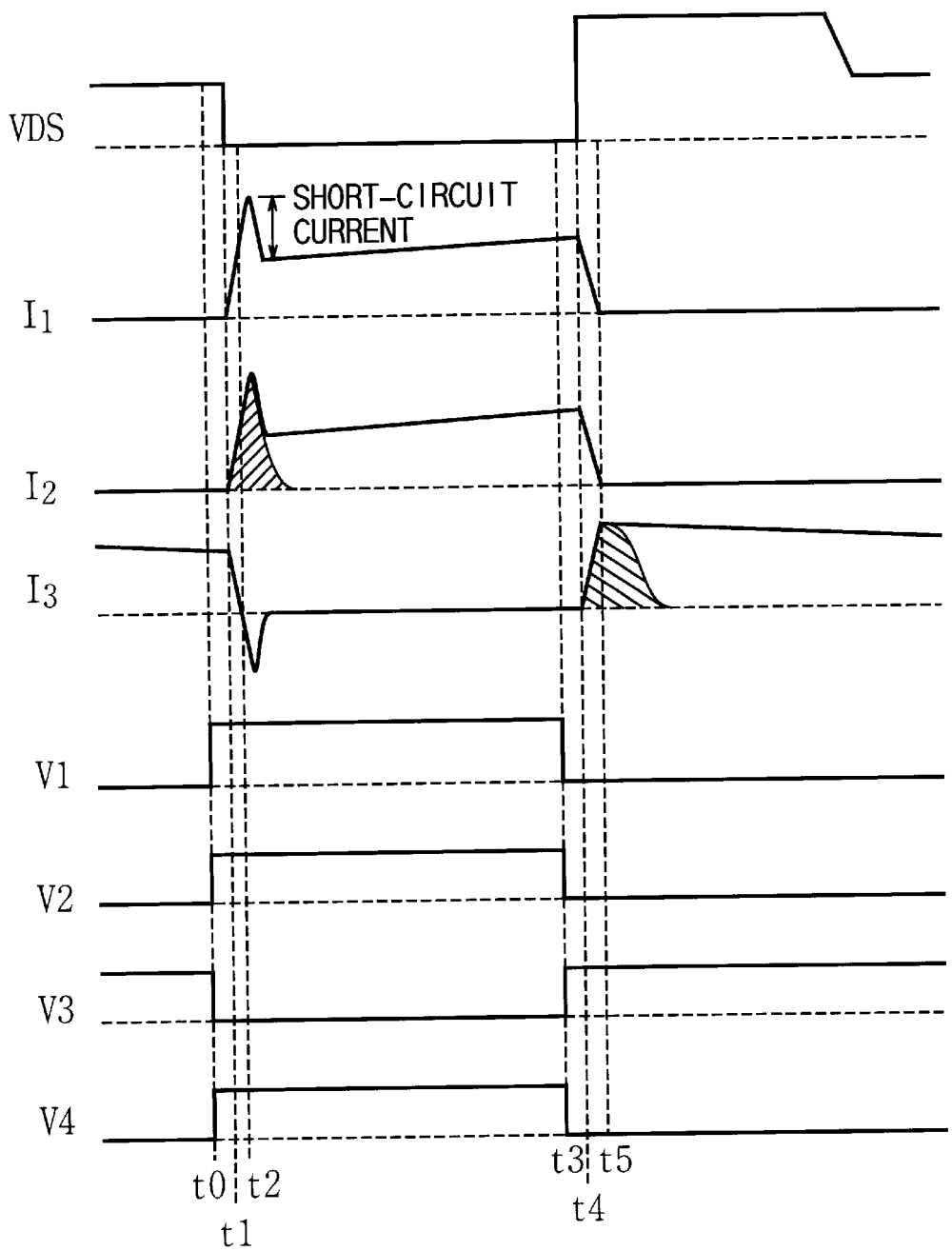
FIG. 6 shows waveforms in various portions of the circuit shown in FIG. 5; and, FIG. 7 is a diagram showing the improvement in efficiency accomplished as the result of the delay time in accordance with the present invention as well as changes in the short-circuit current and the recovery current.

Referring first to FIG. 1, the circuit shown therein is substantially the same in the arrangements and the functions as the conventional circuit shown in FIG. 5, so that corresponding parts are designated by the same reference characters and detailed description will not be repeated.

The circuit shown in FIG. 1 includes a time delay circuit 8 in a line from the control circuit 4 to the driving circuit 5 of the first switching element 1. An insulating circuit 9 is connected on one hand with the driving circuits 6 and 7 of the second and third switching elements 2 and 3, and on the other hand with the control circuit 4 at a connection between the control circuit 4 and the time delay circuit 8. It will therefore be understood that the control signal V4 is applied directly to the driving circuits 6 and 7 but through the time delay circuit 8 to the driving circuit 5.

Figure 2:
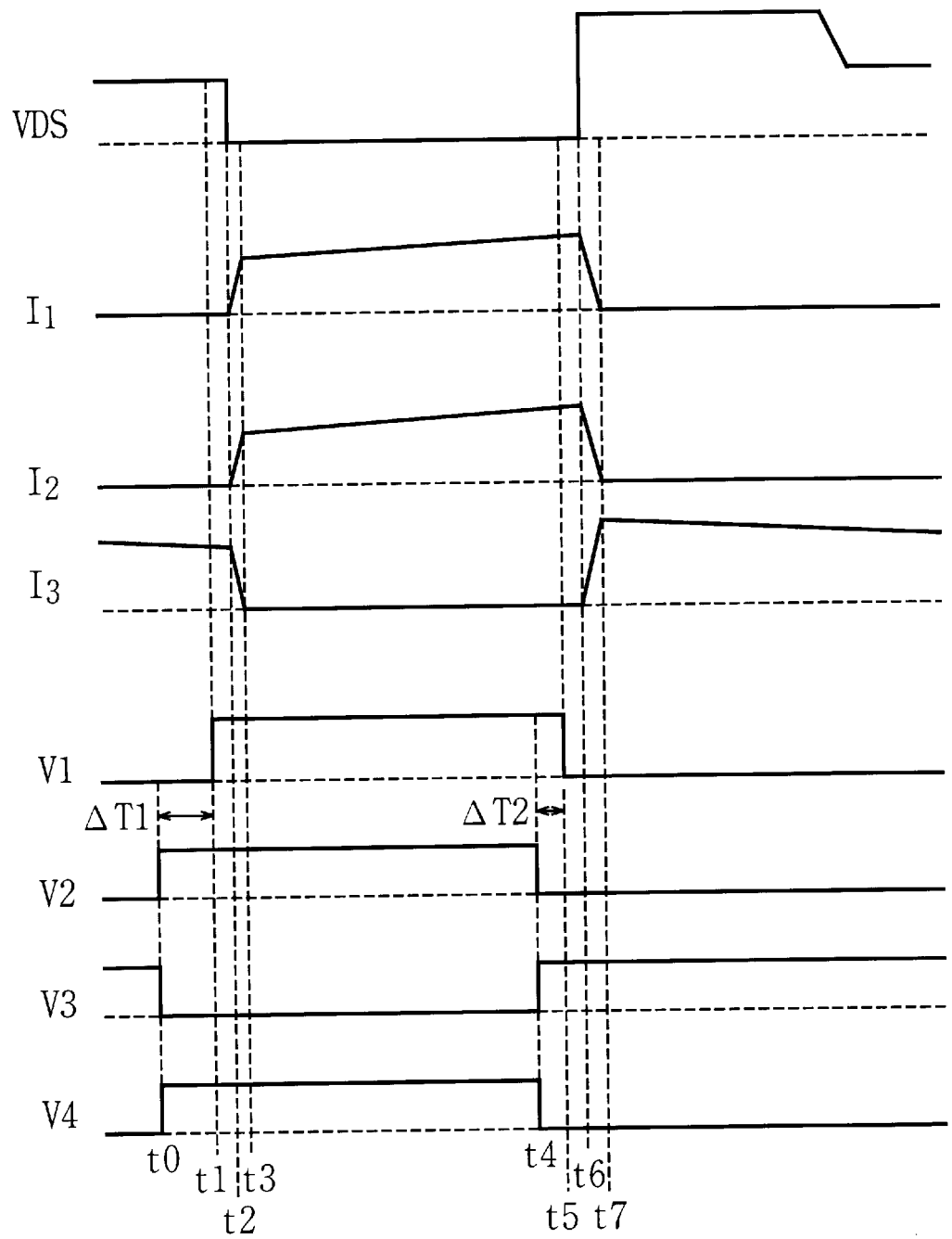
FIG. 2 shows diagrams of voltage and current waveforms in several portions of the circuit shown in FIG. 1.

Referring to FIG. 2, there is shown voltage and current waveforms in various parts in the circuit shown in FIG. 1. When the control signal V4 is turned from low to high at the timing to, the output V2 from the driving circuit 6 is turned to high, and at the same time, the output V3 from the driving circuit 7 is turned to low. The driving circuit 5 for the first switching element 1 receives the control signal V4 with a time delay corresponding to a time period $\Delta T_1$, so that the output V1 from the driving circuit 5 is turned from low to high at the timing $t_1$ which is delayed from the timing $t_0$ by the time period $\Delta T_1$. The switching element 1 is turned on at the timing $t_2$ with a time delay from the timing to by a value corresponding to the operating characteristics of the switching element 1. Current $I_1$ thus flows through the primary winding 11a of the transformer 11. At the same time, current $I_2$ is then generated in the secondary winding 11b. The current $I_3$ which has been flowing through the switching element 3 during the off period of the first switching element 1 starts to decrease at the timing $t_0$ and becomes zero at the timing $t_0$. The current $I_1$ and the current $I_2$ reach the respective steady value at the timing $t_3$ The switching element 3 is turned off at the timing $t_0$ after being delayed from the timing to for a time period corresponding to the operating characteristics of the switching element 3. The time period $\Delta T_1$ is determined so that the switching element 3 is turned off at the timing $t_3$. In general, the delay time of a switching element is longer when the element is turned off than when it is turned on. Therefore, the switching element 2 is in the on state at a timing earlier than the timing $t_2$.

In the illustrated circuit, the third switching element 3 is turned off when the current $I_3$ becomes zero at the timing $t_3$. It is therefore possible to prevent the short-circuit current from flowing through the secondary winding 11b of the transformer 11. The second switching element 2 is turned on by the time $t_2$ when the current $I_2$ starts to flow so that the current $I_2$ flows through the channel between the source and the drain. Thus, there will be substantially no current through the parasitic diode. In this manner, it is possible in the embodiment of the present invention to decrease losses and suppress noise generation.

When the control signal V4 is turned from high to low at the timing $t_4$, the output V2 of the driving circuit 6 is turned to low. At the same time, the output V3 of the driving circuit 7 is turned from low to high. The output V1 of the driving circuit 5 for the first switching element 1 is turned from high to low at the timing $t_5$ after being delayed from the timing $t_4$ by the time period $\Delta T_2$. The switching element 1 is turned off at the timing $t_6$ after being delayed from the timing $t_5$ by a time period corresponding to the operating characteristics of the switching element 1, whereupon the currents $I_1$ and $I_2$ start to decrease and the current $I_3$ starts to increase. The time period $\Delta T_2$ is determined to correspond to the difference between the delay time when the switching element 1 is turned from the on state to the off state and the delay time when the switching element 1 is turned from the off state to the on state. Thus, the switching element 3 is already turned on when the switching element 1 is turned off at the timing $t_5$ so that there will be essentially no current through the parasitic diode in the switching element 3.

In general, the delay time in a switching element is longer when the element is turned off than when it is turned on. Therefore, in this embodiment, the second switching element 2 is turned off at a timing $t_7$ which is later than the timing $t_6$. Thus, the current $I_2$ can flow through the channel in the switching element 2 until the timing $t_7$. Therefore, there will be essentially no current through the parasitic diode in the switching element 2.

In the aforementioned embodiment, it is desirable to determine the delay time $\Delta T_1$ when the control signal V4 is turned from low to high independently from the delay time $\Delta T_2$ when the control signal V4 is turned from high to low. However, substantially satisfactory results can be obtained even when these values are determined to be the same. It should further be noted that, depending on the circuit arrangements, input conditions and/or the characteristics of the switching elements, the delay time $\Delta T_2$ when the control signal V4 is turned from high to low may be zero.

Figure 3:
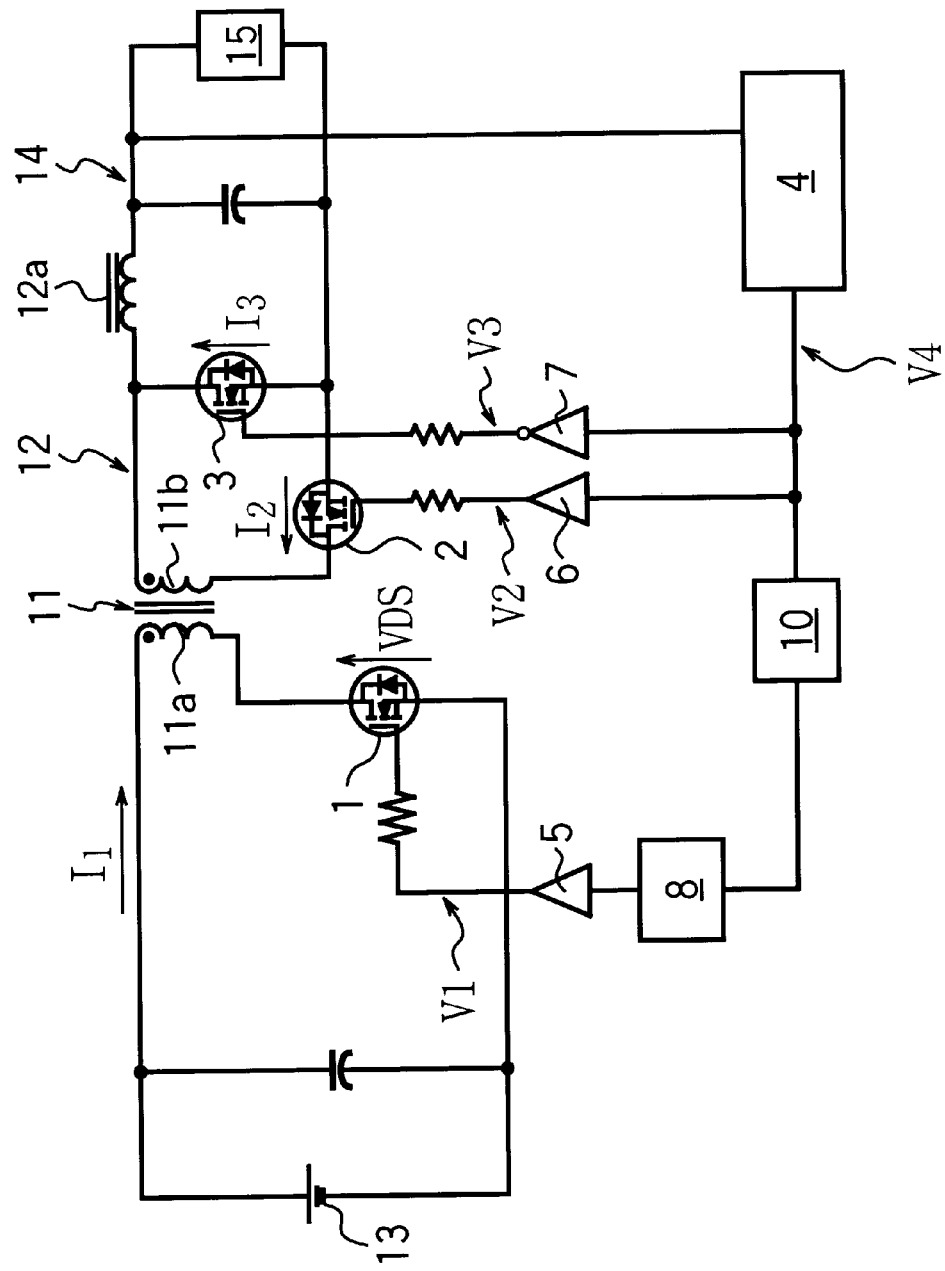
FIG. 3 is a circuit diagram similar to FIG. 1 but showing a switching power source device in accordance with another embodiment of the present invention.

In FIG. 3, there is shown another embodiment of the present invention. In this embodiment, the control circuit 4 is provided in the secondary circuit of the transformer 11. The control signal V4 from the control circuit 4 is applied directly to the driving circuits 6 and 7 without flowing through the insulating circuit. In other respects, arrangements and operations in this embodiment are the same as those in the previous embodiment.

Figure 4:
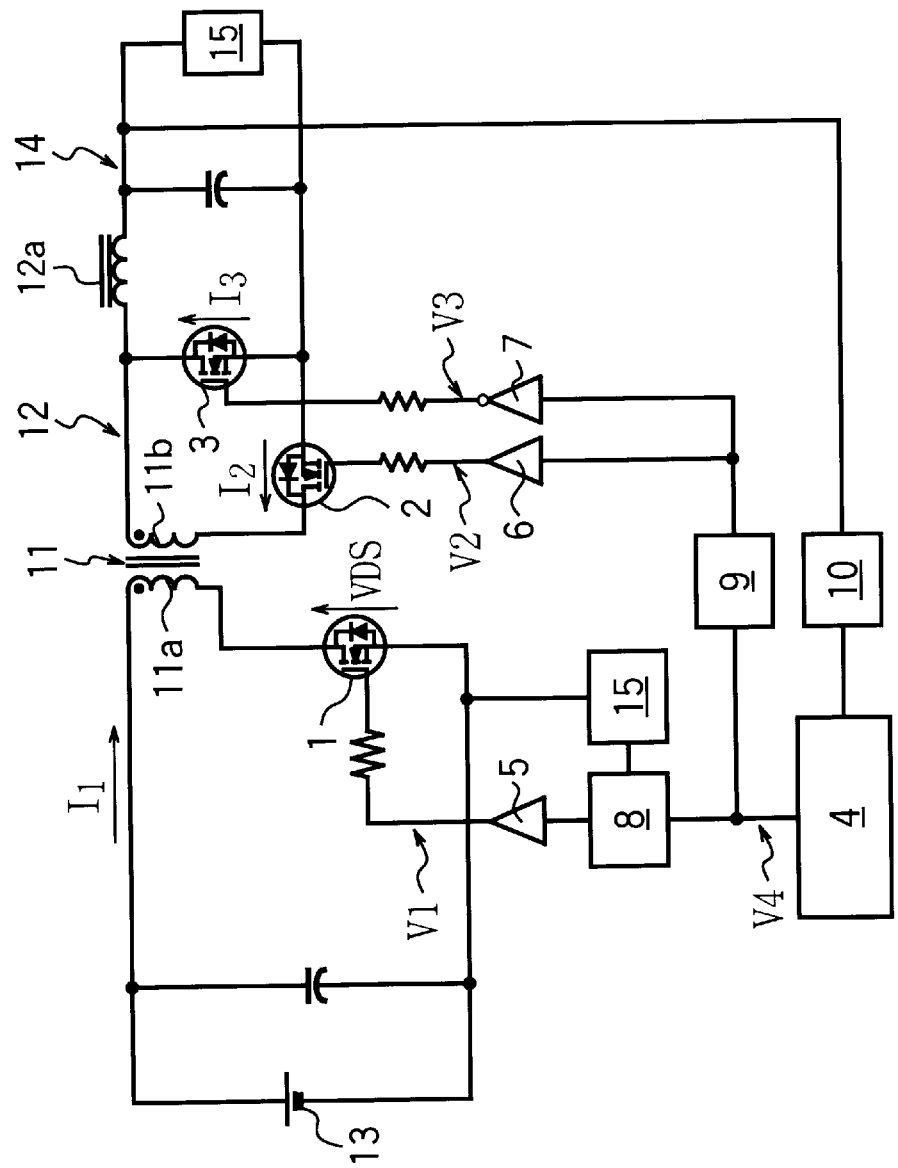
FIG. 4 is a circuit diagram similar to FIG. 1 but showing a switching power source device in accordance with a further embodiment of the present invention.

FIG. 4 shows a further embodiment of the present invention. In this embodiment, the transformer 11 is provided in the secondary circuit with a current detecting circuit 15. The current detecting circuit 15 is connected with the delay circuit 8 and controls the delay circuit 8 so that the delay time $\Delta T_1$ is increased in response to a decrease in the output current and the delay time $\Delta T_1$ is decreased in response to an increase in the output current. In the arrangement of the embodiment shown in FIG. 1, the timing when the current $I_3$ is decreased from a steady value to zero and the timing when the currents $I_1$ and $I_2$ are increased from zero to a steady value will become earlier than the timing $t_3$ and approaches to the timing $t_2$ when the load current is decreased. However, the timing $t_3$ when the third switching element 3 is turned off is left unchanged.

Therefore, it will be possible that the switching elements 1 and 2 are turned on during the time when the switching element 3 is still in the on state. It is therefore possible that short-circuit current flows in the circuit including the secondary winding of the transformer 11 through the switching elements 2 and 3 possibly causing noise. However, the circuit shown in FIG. 4 can avoid the problem since the delay time is controlled in accordance with the output current.

The improvements which the arrangements of the present invention can accomplish in respect of efficiency have been calculated by way of example. In the calculation, assumption has been made that in a conventional circuit current flows through a parasitic diode in the switching element for 211 nS due to a delay in operation to create a voltage drop of 0.9 V at the parasitic diode. The nominal rate of the power source device was $V_0$=3.3 V, $I_0$=15 A, and the driving frequency of 250 kHz. The resistance of the switching element in conductive state was assumed to be 5.7 mΩ.

Assuming that the efficiency of the rectifying circuit containing diodes being 75%, the efficiency of the rectifying circuit having FET type switching elements in the place of the diodes will have an efficiency of 82.9% in the prior art, whereas the arrangement of the present invention shown in FIG. 1 shows an efficiency of 83.9%. The value of the efficiency of the present invention obtained by this calculation is the result of calculation taking only into consideration the efficiency improvement due to the compensation of the operation time delay of the switching elements. In accordance with the present invention, an improvement in the efficiency can be expected due to a decrease in the loss caused by short-circuit current. Further it is also possible to accomplish a significant decrease in noise.

In FIG. 7, there are shown changes in efficiency, short-circuit current and recovery current wherein the value $\Delta T_1$ has been changed with the operation time delay $\Delta T_2$ maintained constant in the circuit used in the aforementioned calculation. The short-circuit current and the recovery current are portions of the current $I_3$ through the third switching element 3, which flows in the direction opposite to the direction shown by the arrow. It will be understood in the drawing that an increase in the delay time results in a decrease in short-circuit current and consequently an improvement in efficiency by approximately 5%. This improvement in efficiency includes in part a portion which is the result of compensation of the operation time delay in the second switching element 2. If the time delay is tooloOng, the third switching element 3 is turned off when the current $I_3$ is still flowing. The current $I_3$ thus flows through the parasitic diode causing a decrease in efficiency. If the first switching element 1 is turned on while the current $I_3$ is flowing through the parasitic diode in the third switching element 3, a recovery current flows through the parasitic diode in the third switching element 3. The recovery current increases in response to an increase in the delay time and causes a loss of efficiency.

In the embodiment of FIG. 4, use is made of a current detecting circuit 15 connected with the primary circuit of the transformer 11 for detecting the load current. The current detecting circuit however may be connected with the secondary circuit of the transformer 11.

We claim:

1. A synchronized rectifier type switching power source device including;

a switching circuit including a first switching device for converting an input voltage into a high frequency;

a transformer having a primary winding connected with the switching circuit and a secondary winding connected with an output circuit;

the output circuit including a rectifying device having a second switching device and a magnetic element connected in series with the secondary winding of the transformer;

the rectifying device further having a third switching device connected in parallel with the secondary winding of the transformer;

a control device for producing a control signal which is to be applied to the first switching device for controlling the same in a manner that an output voltage of a predetermined value is produced;

said second switching device being controlled by the control device through a signal synchronized with the control signal applied to the first switching device; and, said third switching device being controlled by the control device through a signal which is opposite in timing to the control signal applied to the first switching device;

characterized by;

a signal timing adjusting device for controlling the timing of the control signal applied to the first switching device and those of the control signals applied to the second and third switching devices, so that the control signal is applied to the first switching device with a timing delayed as compared with the timings of the control signals applied to the second and third switching devices to thereby compensate for the operating time delay among the first switching device and the second and third switching devices due to differences in voltage durability and current capacity among these switching devices.

2. A switching power source device in accordance with claim 1 in which said signal timing adjusting device is a time delay device for delaying the timing of the control signal applied to the first switching device.

3. A switching power source device in accordance with claim 2 in which said time delay device is capable of determining separately delay times for signal turning on and for signal turning off.

4. A switching power source device in accordance with claim 3 which has a load current detecting device for detecting a load current so that the delay time for the turning on signal for the first switching device can be changed in accordance with the value of the load current.

* * * * *